US005428959A

United States Patent [19]

Figiel et al.

[11] Patent Number: 5,428,959

[45] Date of Patent: Jul. 4, 1995

[54] PNEUMATIC CONTROL CIRCUIT

[75] Inventors: Janusz Figiel, Mount Prospect; Nelson Cheung, Hoffman Estates; Allen D. Sordyl, Wheeling, all of Ill.

[73] Assignee: Illinois Tool Works Inc., Glenview, Ill.

[21] Appl. No.: 283,546

[22] Filed: Aug. 1, 1994

[51] Int. Cl.[6] ........................ F16D 31/02; F15B 13/16

[52] U.S. Cl. ........................................ 60/412; 60/426; 91/365; 91/461; 91/529

[58] Field of Search ................. 91/170 R, 193, 189 R, 91/508, 513, 516, 520, 358 R, 365, 461, 529, 444, 448; 60/407, 412, 420, 424, 426, 427; 92/129

[56] References Cited

U.S. PATENT DOCUMENTS

| | | | |
|---|---|---|---|
| 4,825,512 | 5/1989 | Tremper et al. | 24/20 EE |
| 4,919,039 | 4/1990 | Nutter | 91/461 X |
| 5,136,888 | 8/1992 | Nix | 74/88 |
| 5,335,499 | 8/1994 | Thompson et al. | 91/520 X |

FOREIGN PATENT DOCUMENTS

| | | | |
|---|---|---|---|
| 2524780 | 12/1976 | Germany | 60/407 |
| 3245389 | 6/1983 | Germany | 91/520 |
| 0823667 | 4/1981 | U.S.S.R. | 91/461 |

*Primary Examiner*—Edward K. Look
*Assistant Examiner*—Hoang Nguyen
*Attorney, Agent, or Firm*—Dressler, Goldsmith, Shore & Milnamow, Ltd.

[57] ABSTRACT

In a pneumatic control circuit, five three-port, two-position, directional control valves, three of which have manual controls, and two shuttle valves are arranged for controlling a first pneumatic device and a second pneumatic device in an operating mode wherein the second pneumatic device cannot be readily enabled before the first pneumatic device is enabled. A first control valve having a manual control is arranged to control the first pneumatic device. A second control valve having a pilot valve is arranged to control the second pneumatic device. A pilot control valve having a manual control is arranged to connect the first control valve to the pilot valve of the second control valve via a shuttle valve. A holding control valve has a cam control, which is operated by the second pneumatic device, and has an outlet connected to the pilot valve of the second control valve. A shut-off control valve is arranged to control the first control valve via another shuttle valve and via a pilot valve of the first control valve.

5 Claims, 1 Drawing Sheet

PNEUMATIC CONTROL CIRCUIT

TECHNICAL FIELD OF THE INVENTION

This invention pertains to a pneumatic control circuit employing plural three-port, two-position, directional control valves, some of which have manual controls, for controlling a first pneumatic device and a second pneumatic device in an operating mode wherein the second pneumatic device cannot be readily enabled before the first pneumatic device is enabled. As an example, the respective pneumatic devices may be pneumatic motors, which may be employed in a strapping tool.

BACKGROUND OF THE INVENTION

Strapping tools of a type in widespread use are designed to tension the overlapped ends of a steel strap drawn from a supply and wrapped around a load, to punch interlockable shoulders into the overlapped ends of the steel strap and to cut one of the overlapped ends from any steel strap remaining in the supply, and to release the overlapped ends, so as to form a tensioned loop of the steel strap around the load. A steel strap having interlockable shoulders punched into its overlapped ends, as by a strapping tool of the type noted above, is exemplified in Tremper et al. U.S. Pat. No. 4,825,512.

Although as exemplified in Nix U.S. Pat. No. 5,136,888 many strapping tools of the type noted above are lever-actuated tools without pneumatic, electrical, or other motors, it is known for such strapping tools to be pneumatically powered and to have separate pneumatic motors controlled by manually controlled valves respectively for tensioning and for punching and cutting.

One concern with such a pneumatically powered strapping tool is that the respective pneumatic motors must be sequentially operated to form a tensioned loop. The pneumatic motor employed for tensioning must be energized for a sufficient time to tension the overlapped ends before the pneumatic motor employed for punching and cutting is energized. Otherwise, when the overlapped ends are released, the resultant loop may not be adequately tensioned and the overlapped ends may not interengage where punched.

Typically, however, the manually controlled valves controlling the respective pneumatic motors of such pneumatically powered strapping tools known heretofore can be independently controlled. Therefore, through inadvertence, a user may energize the pneumatic motor employed for punching and cutting before the pneumatic motor employed for tensioning has been energized for a sufficient time.

SUMMARY OF THE INVENTION

This invention provides a pneumatic control circuit employing plural three-port, two-position, directional control valves, some of which have manual controls, for controlling a first pneumatic device and a second pneumatic device in an operating mode wherein the second pneumatic device cannot be readily enabled before the first pneumatic device is enabled. The respective pneumatic devices may be pneumatic motors in a strapping tool of the type noted above, pneumatic motors in another apparatus, or other pneumatic devices.

In the pneumatic control circuit, the aforenoted control valves include a first control valve having an inlet port connectible to a source of pneumatic pressure and having an outlet port connected to the first pneumatic device. The first control valve is positionable in a return position wherein the first control valve disables the first pneumatic device and a control position wherein the first control valve enables the first pneumatic device if the first control valve is connected to a source of pneumatic pressure. The first control valve has a manual control constituting means for positioning the first control valve in its control position when the manual control is actuated manually. The first control valve has a return spring constituting means for positioning the first control valve in its return position when the manual control is not actuated manually.

Moreover, the aforenoted control valves include a second control valve having an inlet port connectible to a source of pneumatic pressure and having an outlet port connected to the second device. The second control valve is positionable in a return position wherein the second control valve disables the second device and in a control position wherein the second control valve enables the second device if the inlet port of the second device is connected to a source of pneumatic pressure. The second control valve has a pilot valve constituting means for positioning the second control valve in its control position when the pilot valve is actuated pneumatically. The second control valve has a return spring constituting means for positioning the second valve in its return position when the pilot valve of the second control valve is deactuated.

Furthermore, the aforenoted control valves include a pilot control valve having an inlet port connected to the outlet port of the first control valve and having an outlet port connected to the inlet port of the second control valve. The pilot control valve is positionable in a return position wherein the pilot control deactuates the pilot valve of the second control valve and in a control position wherein the pilot control valve actuates the pilot valve of the second control valve pneumatically if the first control valve is connected to a source of pneumatic pressure and if the manual control of the first control valve is actuated manually.

Additionally, the aforenoted control valves may further include a holding control valve having an inlet port connectible to a source of pneumatic pressure and having an outlet port connected to the pilot valve of the second control valve. The holding control valve is positionable in a return position wherein the holding control valve deactuates the pilot valve of the second control valve and in a control position wherein the holding control valve actuates the pilot valve of the second control valve pneumatically if the second control valve is connected to a source of pneumatic pressure.

The holding control valve has a cam control constituting means for positioning the holding control valve in its control position when the cam control is actuated and a return spring constituting means for positioning the holding control valve in its return position except when the cam control is actuated. The cam control includes a cam arranged to be rotatably driven by the second device and shaped so as to be generally circular except for one dwell. The cam control further includes means including a roller engaged with the cam for deactuating the cam control when the roller engages the cam at the dwell and for actuating the cam control when the roller engages the cam except at the dwell.

Preferably, the first control valve has a pilot valve constituting means for positioning the first control valve in its return position when the pilot valve of the first control valve is actuated pneumatically. Preferably, moreover, the aforenoted control valves further include a shut-off control valve having an inlet port connectible to a source of pneumatic pressure and having an outlet port connected to the first control valve. The shut-off control valve is positionable in a return position wherein the shutoff control valve does not actuate the pilot valve of the first control valve pneumatically and in a control position wherein the shut-off control valve actuates the pilot valve of the first control valve pneumatically if the shut-off control valve is connected to a source of pneumatic pressure.

Preferably, the pneumatic control circuit further comprises two shuttle valves, namely a shuttle valve having an inlet port connected to outlet port of the pilot control valve, an inlet port connected to outlet port of the second control valve, and an outlet port connected to the pilot valve of the second control valve and a shuttle valve having an inlet port connected to the outlet port of the shut-off control valve, an inlet port connected to the outlet port of the holding control valve, and an outlet port connected to the pilot valve of the first control valve.

Moreover, in a preferred embodiment of this invention, the first control valve has a latching control constituting means for latching the first control valve releasably in its control position.

These and other objects, features, and advantages of this invention are evident from the following description of a preferred embodiment of this invention with reference to the accompanying drawings.

DETAILED DESCRIPTION OF PREFERRED EMBODIMENT

Figure 1:
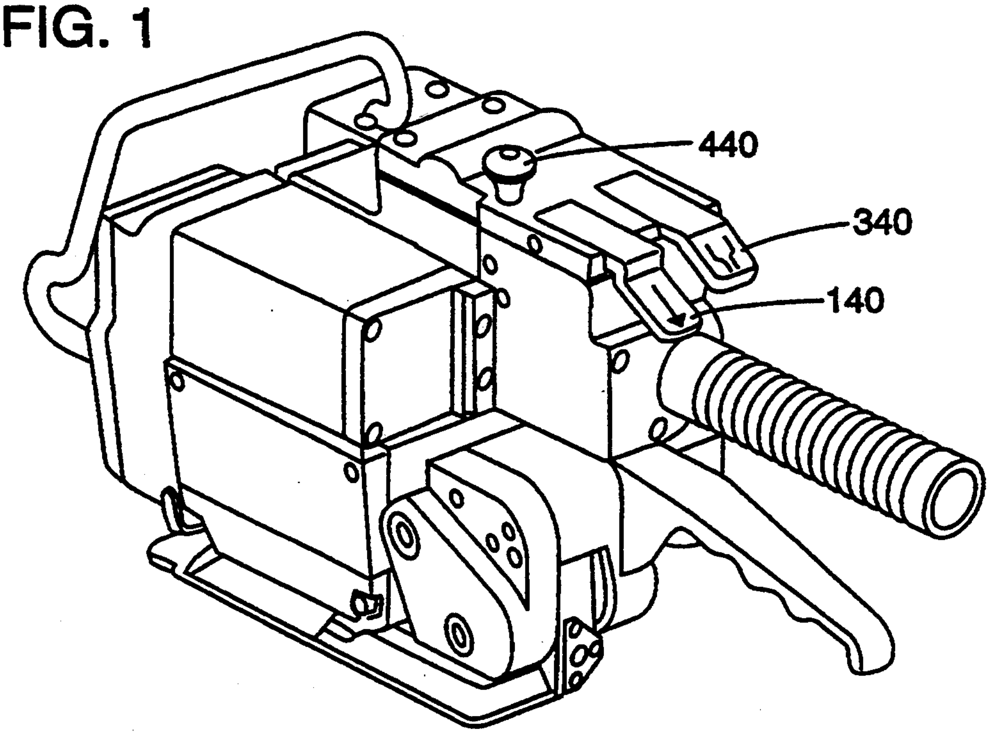
FIG. 1 is a perspective view of a strapping tool of the type noted above, which comprises a first pneumatic motor, a second pneumatic motor, and a pneumatic control circuit embodying this invention.
Figure 2:
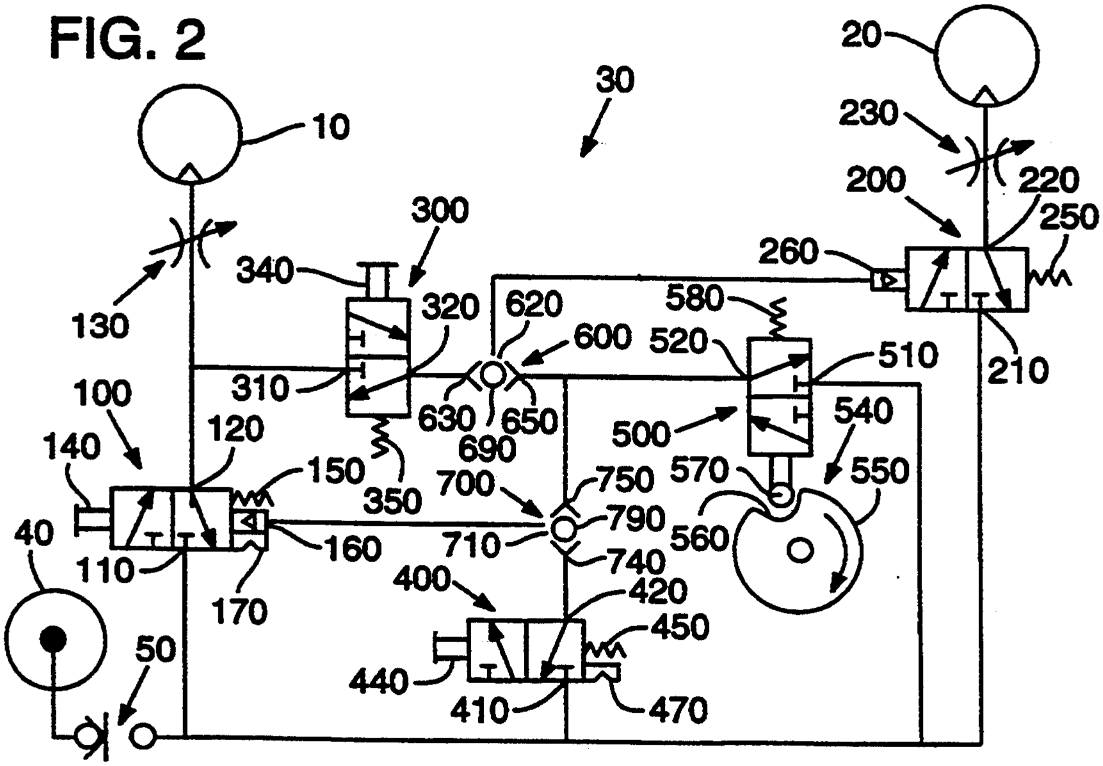
FIG. 2 is a schematic diagram of the first pneumatic motor, the second pneumatic motor, and the pneumatic control circuit, as connected to a source of pneumatic pressure.

As shown in FIGS. 1 and 2, a strapping tool of the type noted above comprises a first pneumatic motor 10, a second pneumatic motor 20, and a pneumatic control circuit 30 for controlling the first pneumatic motor 10 and the second pneumatic motor 20 in an operating mode wherein the second pneumatic motor 20 cannot be readily enabled before the first pneumatic motor 10 is enabled. The pneumatic control circuit 30 is shown as connected to a source 40 of pneumatic pressure, such as an air compressor, via a quick acting coupling 50. The pneumatic control circuit 30 comprises five three-port, two-position, directional control valves, two shuttle valves, and two throttle valves, as described below.

The strapping tool is designed to tension the overlapped ends of a steel strap drawn from a supply and wrapped around a load, via the first pneumatic motor 10, to punch interlockable shoulders into the overlapped ends of the steel strap and to cut one of the overlapped ends from any steel strap remaining in the supply, via the second pneumatic motor 20, and to release the overlapped ends, so as to form a tensioned loop of the steel strap around the load. The steel strap and the load are not shown.

It is convenient, therefore, to refer to the first pneumatic motor 10 as the tensioning motor and to refer to the second pneumatic motor 20 as the sealing motor. Details of mechanisms operated by the first pneumatic motor 10 for tensioning the steel strap, mechanisms operated by the second pneumatic motor 20 for punching and cutting, and other mechanisms of the strapping tool are outside the scope of this invention. Reference may be had to Tremper et al. U.S. Pat. No. 4,825,512 for an example of a steel strap having interlockable shoulders punched into its overlapped ends.

In the pneumatic control circuit 30, a first three-port, two-position, directional control valve 100 has an inlet port 110 connectible and connected, as shown, to the source 40 of pneumatic pressure, via the quick acting coupling 50. Also, the first directional control valve 100 has an outlet port 120 connected to the first pneumatic motor 10 via a throttle valve 130, which is adjustable. It is convenient to refer to the first directional control valve 100 as the first motor control valve.

The first motor control valve 100 is positionable in a return position wherein the first device control valve 100 disables the first pneumatic motor 10 by blocking pneumatic pressure from the source 40. The first motor control valve 100 is positionable in a control position wherein the first motor control valve 100 enables the first pneumatic motor 10 if the first motor control valve 100 is connected to the source 40 of pneumatic pressure. The first motor control valve 100 is shown in its return position.

The first motor control valve 100 has a manual control 140 constituting means for positioning the first motor control valve 100 in its control position when the manual control 140 is actuated manually. The manual control 140 is shown as a finger-actuatable lever, which is labelled with a mnemonic symbol for tensioning, in FIG. 1. The first motor control valve 100 has a return spring 150 constituting means for positioning the first motor control valve 100 in its return position when the manual control 140 is not actuated manually. The first motor control valve 100 has a pilot valve 160 constituting means for positioning the first motor control valve 100 in its return position, after it has been latched as discussed below, when the pilot valve 160 of the first motor control valve 100 is actuated pneumatically. The first motor control valve 100 has a detent latch 170 constituting means for latching the first motor control valve 100 releasably in its control position. The detent latch 170 is controlled by the manual control 140 and is pneumatically releasable as discussed above.

Moreover, a second three-port, two-position, directional control valve 200 has an inlet port 210 connectible and connected, as shown, to the source 40 of pneumatic pressure, via the quick acting coupling 50. Also, the second directional control valve 200 has an outlet port 220 connected to the second pneumatic motor 20 via a throttle valve 230, which is adjustable. It is convenient to refer to the second directional control valve 200 as the second motor control valve. The second motor control valve 200 is positionable in a return position wherein the second motor control valve 200 disables the second pneumatic motor 20 by blocking pneumatic pressure from the source 40. The second motor control valve 200 is positionable in a control position wherein the second motor control valve 200 enables the second pneumatic motor 20 if the second motor control valve 200 is connected to the source 40 of pneumatic pressure.

The second motor control valve 200 has a pilot valve 260 constituting means for positioning the second motor control valve 200 in its control position when the pilot valve 260 is actuated pneumatically. The second motor control valve 200 has a return spring 250 constituting means for positioning the second valve 200 in its return position when the pilot valve 260 is not actuated pneumatically.

Furthermore, a third three-port, two-position, directional control valve 300 has an inlet port 310 connected to the outlet port 120 of the first motor control valve 100. Also, the third directional control valve 300 has an outlet port 320 connected to the pilot valve 260 of the second motor control valve 200, via a shuttle valve 600 to be later described. In view of its function, it is appropriate to refer to the third directional control valve 300 as an pilot control valve. The pilot control valve 300 is positionable in a return position wherein the pilot control valve 300 deactuates the pilot valve 260 of the second motor control valve 200 by venting the pilot valve 260. The pilot control valve 300 is positionable in a control position wherein the third control valve 300 actuates the pilot valve 260 of the second motor control valve 200 if the inlet port of the first motor control valve 100 is connected to the source 40 of pneumatic pressure and if the manual control 140 of the first motor control valve 100 is actuated manually.

The pilot control valve 300 has a manual control 340 constituting means for positioning the third control valve 300 in its control position when the manual control 340 is actuated manually. The manual control 340 is shown as a finger-actuatable lever, which is marked with a mnemonic symbol for sealing, in FIG. 1. The pilot control valve 300 has a return spring 350 constituting means for positioning the third control valve 300 in its return position when the manual control 340 is not actuated manually.

Furthermore, a fourth three-port, two-position, directional control valve 400 has an inlet port 410 connected to the source 40 of pneumatic pressure, via the quick acting coupling 50. Also, the fourth control valve 400 has an outlet port 420 connected to the pilot valve 160 of the first motor control valve 100, via a shuttle valve 700 to be later described. In view of its function, it is appropriate to refer to the fourth control valve 400 as an shut-off control valve.

The shut-off control valve 400 has a manual control 440 constituting means for positioning the shut-off control valve 400 in its control position when the manual control 440 is actuated manually. The manual control 440 is shown as a finger-actuatable button in FIG. 1. The shut-off control valve 400 has a return spring 450 constituting means for positioning the shut-off control valve 400 in its return position when the manual control 440 is not actuated manually. The shut-off control valve 400 has a detent latch 470 constituting means for latching the shut-off control valve 400 in its control and return positions. The detent latch 470 is controlled by the manual control 440.

Additionally, a fifth three-port, two-position, directional control valve 500 has an inlet port 510 connected to the source 40 of pneumatic pressure, via the quick acting coupling 50. Also, the fifth control valve 500 has an outlet port 520 connected to the pilot valve 160 of the first motor control valve 100, via the shuttle valve 700 to be later described. In view of its function, it is appropriate to refer to the fifth control valve 500 as a holding control valve.

The holding control valve 500 is positionable in a return position wherein the holding control valve 500 deactuates the pilot valve 260 of the second motor control valve 200 by venting the pilot valve 260 via the shuttle valve 600. The holding control valve 500 is positionable in a control position wherein the holding control valve 500 actuates the pilot valve 260 of the second motor control valve 200 pneumatically if the second motor control valve is connected to the source 40 of pneumatic pressure.

The holding control valve 500 has a cam control 540 constituting means for positioning the holding control valve 500 in its control position when the cam control 540 is actuated. The holding control valve 500 has a return spring 580 constituting means for positioning the holding control valve 500 in its return position except when the cam control 540 is actuated.

The cam control 540 includes a cam 550, which is arranged to be rotatably driven by the second pneumatic motor 20, and which is shaped so as to be generally circular except for one dwell 560. The cam control 540 further includes means including a roller 570 engaged with the cam 550 for deactuating the cam control 540 when the roller 570 engages the cam 550 at the dwell 560 and for actuating the cam control 540 when the roller 570 engages the cam 550 except at the dwell 560. In a dormant position, in which the cam control 540 is shown, the roller 570 engages the cam 550 at the dwell 560. In the strapping tool, each 360° rotation of the cam 550 corresponds to one punching and cutting cycle.

The shuttle valve 600 has an inlet port 630 connected to the outlet port 320 of the pilot control valve 300, an inlet port 650 connected to the outlet port 520 of the holding control valve 500, and an outlet port 620 connected to the pilot valve 260 of the second motor control valve 200. The shuttle valve 600 has a shuttle 690, which is movable so as to close one of the inlet ports 650, 630, as pneumatic pressure is applied to the shuttle 690 through the other inlet port. The shuttle valve 700 has an inlet port 740 connected to the outlet port 420 of the shut-off control valve 400, an inlet port 750 connected to the outlet port 520 of the holding control valve 500, and an outlet port 710 connected to the pilot valve 160 of the first motor control valve 100. The shuttle valve 700 has a shuttle 790, which is movable so as to close one the inlet ports 750, 740, as pneumatic pressure is applied to the shuttle 790 through the other inlet port. The inlet port 650 of the shuttle valve 600 and the inlet valve 750 of the shuttle valve 700 are interconnected.

When the quick acting coupling 50 is connected to the source 40 of pneumatic pressure, the inlet ports 110, 210, 410, and 510 of the respective control valves 100, 200, 400, and 500 are connected thereto. Thus, the strapping tool comprising the first pneumatic motor 10, the second pneumatic motor 20, and the pneumatic control circuit 30 is ready for operation.

Thereupon, if the manual control 140 is actuated manually, the first control valve 100 is repositioned from its return position into its control position. Thus, pneumatic pressure is applied to and enables the tensioning motor 10, via the first control valve 100 and the throttle valve 130. Also, pneumatic pressure is applied to the inlet port 310 of the pilot control valve 300, via the first control valve 100. If the manual control 140 is actuated with sufficient force, the latching detent 170 latches the first control valve 100 releasably in its control position. As pneumatic pressure continues to be thus applied to the tensioning motor 10, the tensioning motor 10 operates until the manual control 140 is released before the latching detent 170 is released (whereupon the return spring 150 deactuates the manual control 140 and repositions the first control valve 100 into its return position) or until the tensioning motor 10 stalls after the latching detent 170 has been latched.

If the manual control 440 of the shut-off control valve 400 is actuated manually while the first motor control valve 100 is latched in its control position, pneumatic pressure is applied to the pilot valve 160 of the first motor control valve 100. Thus, the first motor control valve 100 is repositioned from its control position to its return position, whereby pneumatic pressure that had been applied to the tensioning motor 10 via the first motor control valve 100 is blocked by the first motor control valve 100. The manual control 440 can be thus actuated to shut off the tensioning motor 10, after the first motor control valve 100 has been latched in its control position and before the tensioning motor 10 stalls, without actuating the manual control 340 of the pilot control valve 300.

If the manual control 340 is actuated manually while the first motor control valve 100 remains in its control position, pneumatic pressure is applied to the pilot valve 260 of the second motor control valve 200 via the first motor control valve 100, the pilot control valve 300, and the shuttle valve 600, in which the inlet port 650 is closed by pneumatic pressure applied to the shuttle 690 through the inlet port 630. Thus, the second motor control valve 200 is repositioned from its return position into its control position, whereupon pneumatic pressure is applied to and enables the sealing motor 20 via the second motor control valve 200.

As pneumatic pressure is applied to the sealing motor 20, via the second motor control valve 200, the sealing motor 20 is operated and rotates the cam 550 from its rest position, as indicated by a curved arrow. As the cam 550 is rotated, the roller 570 engaging the cam 550 is driven from the dwell 560, so as to reposition the holding control valve 500 from its return position into its control position. Thus, pneumatic pressure is applied to the pilot valve 160 of the first motor control valve 100 via the holding control valve 500 and the shuttle valve 700, in which the inlet port 740 is closed by pneumatic pressure applied to the shuttle 790 through the inlet port 750.

As pneumatic pressure is applied to the pilot valve 160, via the holding control valve 500 and the shuttle valve 700, if the first motor control valve 100 has been latched in its control position by the latching detent 170, the first motor control valve 100 is repositioned from its control position to its return position. However, if the first motor control valve 100 has not been latched but the manual control 140 continues to be manually actuated by a user, the user is prompted by a resultant force on the manual control 140 to release the manual control 140 so as to permit the first motor control valve 100 to be thus repositioned.

Moreover, pneumatic pressure that had been applied to the pilot valve 260 via the first motor control valve 100 is blocked by the first motor control valve 100, as repositioned into its return position. However, pneumatic pressure is applied to the pilot valve 260 via the holding control valve 500 and the shuttle valve 600, in which the inlet port 630 is closed by pneumatic pressure applied to the shuttle 690 through the inlet port 650. Thus, pneumatic pressure continues to be uninterruptedly applied to the sealing motor 20, via the second motor control valve 200 and the throttle valve 230.

Once the cam 550 has made a complete revolution so as to return to its rest position, the roller 570 engaging the cam 550 is pressed again into the dwell 560 by the return spring 580, which repositions the holding control valve 500 from its control position into its return position. Thus, pneumatic pressure that had been applied to the pilot valve 260 via the holding control valve 500 is blocked by the holding control valve 500, as repositioned into its return position.

We claim:

1. A pneumatic control circuit connectible to a source of pneumatic pressure and comprising plural three-port, two-position, directional control valves, some of which have manual controls, for controlling a first pneumatic device and a second pneumatic device in an operating mode wherein the second device cannot be readily enabled before the first device is enabled, said valves including (a) a first control valve having an inlet port connectible to the source of pneumatic pressure and having an outlet port connected to the first device, the first control valve being positionable in a return position wherein the first control valve disables the first device and in a control position wherein the first control valve enables the first device if the first control valve is connected to the source of pneumatic pressure, the first control valve having a manual control constituting means for positioning the first control valve in the control position of the first control valve when the manual control is actuated manually and a return spring constituting means for positioning the first control valve in the return position of the first control valve when the manual control is deactuated, (b) a second control valve having an inlet port connectible to the source of pneumatic pressure and having an outlet port connected to the second device, the second control valve positionable in a return position wherein the second control valve disables the second device and in a control position wherein the second control valve enables the second device if the second control valve is connected to the source of pneumatic pressure, the second valve having a pilot valve constituting means for positioning the second control valve in the control position of the second control valve when the pilot valve is actuated pneumatically and a return spring constituting means for positioning the second valve in the return position of the second control valve when the pilot valve is deactuated, and (c) a pilot control valve having an inlet port connected to the outlet port of the first control valve and having an outlet port connected to the inlet port of the second control valve, the pilot control valve being positionable in a return position wherein the pilot control valve deactuates the pilot valve of the second control valve and in a control position wherein the pilot control valve actuates the pilot valve of the second control valve pneumatically if the first control valve is connected to the source of pneumatic pressure and if the manual control of the first control valve is actuated manually.

2. The pneumatic control circuit of claim 1 wherein the two-position directional control valves further include (d) a holding control valve having an inlet port connectible to the source of pneumatic pressure and having an outlet port connected to the pilot valve of the second control valve, the holding control valve being positionable in a return position wherein the holding control valve deactuates the pilot valve of the second control valve and in a control position wherein the holding control valve actuates the pilot valve of the second control valve pneumatically if the second control valve is connected to the source of pneumatic pressure, the holding control valve having means including a cam control for positioning the holding control valve in the control position of the holding control valve when the cam control is actuated and a return spring constituting means for positioning the holding control valve in the return position of the holding control valve except when the cam control is actuated, the cam control including a cam arranged to be rotatably driven by the second device and shaped so as to be generally circular except for one dwell, the cam control further including means including a roller engaged with the cam for deactuating the cam control when the roller engages the cam at the dwell and for actuating the cam control when the roller engages the cam except at the dwell.

3. The pneumatic control circuit of claim 2 wherein the first control valve has a pilot valve constituting means for positioning the first control valve in the return position of the first control valve when the pilot valve of the first control valve is actuated pneumatically and wherein the two-position directional control valves further include (e) a shut-off control valve having an inlet port connectible to the source of pneumatic pressure and having an outlet port connected to the first control valve, the shut-off control valve being positionable in a return position wherein the shut-off control valve does not actuate the pilot valve of the first control valve pneumatically and in a control position wherein the shut-off control valve actuates the pilot valve of the first control valve pneumatically if the shut-off control valve is connected to the source of pneumatic pressure.

4. The pneumatic control circuit of claim 3 further comprising two shuttle valves, namely a shuttle valve having an inlet port connected to the outlet port of the pilot control valve, an inlet port connected to the outlet port of the second control valve, and an outlet port connected to the pilot valve of the second control valve and a shuttle valve having an inlet port connected to the outlet port of the shut-off control valve, an inlet port connected to the outlet port of the holding control valve, and an outlet port connected to the pilot valve of the first control valve.

5. The pneumatic control circuit of claim 4 wherein the first control valve has a detent latch constituting means for latching the first control valve releasably in the control position of the first control valve, the detent latch being controlled by the manual control of the first control valve.

* * * * *